Dec. 7, 1965 W. V. SPURLIN ETAL 3,221,827
GRAVIMETRIC TWO-FEEDER SYSTEM
Filed Dec. 24, 1963 6 Sheets-Sheet 1

INVENTORS
WILLIAM V. SPURLIN, J. DENNY SCOTT
AND GORDON H. DUNN
BY
*William D. Carothers*
THEIR ATTORNEY Dec. 7, 1965  W. V. SPURLIN ETAL  3,221,827
GRAVIMETRIC TWO-FEEDER SYSTEM
Filed Dec. 24, 1963  6 Sheets-Sheet 6
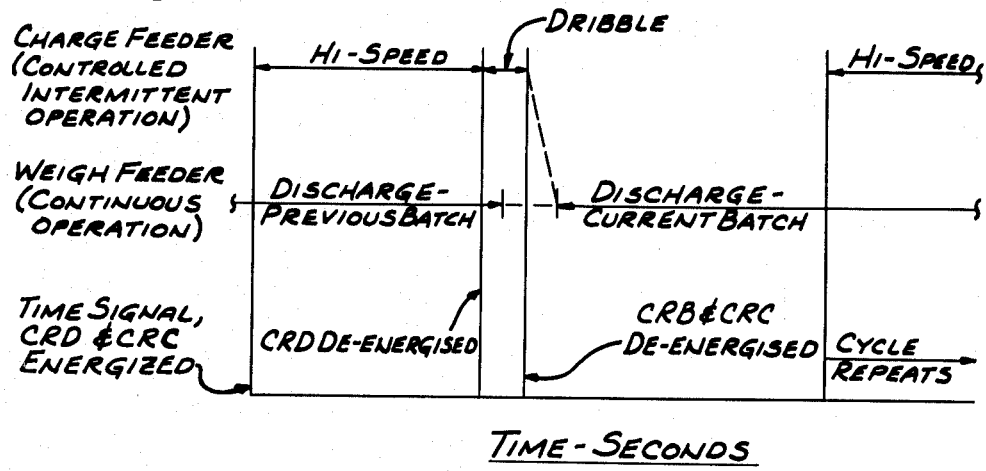
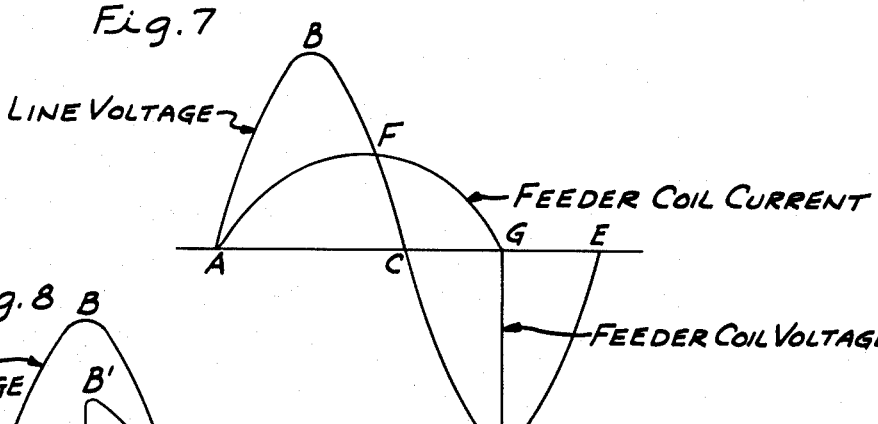
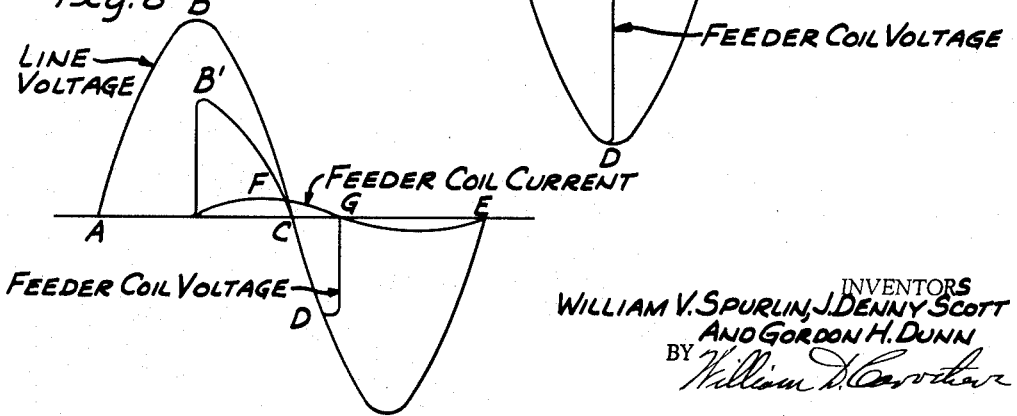
INVENTORS
WILLIAM V. SPURLIN, J. DENNY SCOTT
AND GORDON H. DUNN
BY
THEIR ATTORNEY

United States Patent Office 3,221,827
Patented Dec. 7, 1965

3,221,827
GRAVIMETRIC TWO-FEEDER SYSTEM
William V. Spurlin, Indiana, J. Denny Scott, Homer City, and Gordon H. Dunn, Indiana, Pa., assignors to Link-Belt Company, a corporation of Illinois
Filed Dec. 24, 1963, Ser. No. 333,027
15 Claims. (Cl. 177—210)

This invention relates generally to the method and apparatus for closely controlling the mean feed rate and the total discharge amount in obtaining an accurate predetermined total output of a feeding system.

Gravimetric feeders having a continuously operating feeder supported on a weighing device and is fed by a supply feeder that is controlled by movement of the scale beam between high and low weight points as the material continues to be fed. This system lacks in the accuracy of operation even though attempts are made for correcting the flow rate due to a hunting action in the control. These gravimetric feeders usually provide a continuously running belt mounted on the weighing device.

Another form of gravimetric feeder is the provision of a rotary drum mounted on a weighing device and fed with a controlled conveyor or variable supply. Here again the difficulties presented have the same faults. The hunting and manner of control ultimately result in inaccurate feeding.

These problems are eliminated by the present invention changing the principle of operation of these feeders. The new principle of operaion comprising this invention is the method and apparatus for supplying spaced uniform batches of material to the continuously operating discharge conveyor mounted on a weighing device. The weighing device will accurately shut off the flow of the batch when it reaches a predetermined weight. This batch weight can be made accurately. This materially increases the over-all accuracy of the total amount to be fed over a long period of time.

The next factor is in timing the period allotted for feeding the batch to the continuously operating discharge conveyor and selecting the proper speed of the continuously operating discharge conveyor so that it will start to receive the next consecutive batch before the previous batch has been completely discharged. This determines the amount of material per unit of time and the summation is an accurate predetermined total output. The series of consecutive batches provides an accurate control of the mean rate of feed. With this mode of operation the previous structure may be converted to operate more accurately. However, the improved control circuits and apparatus provide a better machine.

Thus the principal object is the provision of a method and control structure for feeding consecutive batches of material that are equal in weight and are sufficiently close together to amount to a continuous constant supply, but in reality are a continuous series of batches. The small batch may be accurately controlled so that the series, when controlled by a counter or a timer, both of which are very accurate, will provide a material advancement in the art.

Different control circuits for the continuously operating discharge gravimetrically mounted conveyor and the feeder conveyor may be employed with this novel method of feeding material the simplest of which is the use of a timer in combination with one control relay. The next circuit adds to the first a slow and fast operation of the continuous operated discharge gravimetrically mounted conveyor. This permits latitude in the batch period feed which affects the total timing and does not affect the accuracy. The third circuit here applies the fast or slow control of the operation of the feed conveyor. Another circuit control would be the combination of the second and third circuits. The next control circuit employs a magnetic amplifier with a magnetic pickup to actuate a silicon controlled rectifier parallel with the power semiconductor that operates the feeder conveyor in series with a saturable reactor. This more refined control may be supplemented with a fast and slow control of the continuously operating discharge conveyor as outlined in the foregoing second control or by the use of a magnetic amplifier as just outlined.

In each of the novel circuits the general principle of employing a continuous series of accurately measured batches is employed to produce a true weight of the total amount of material supplied or a true and accurate weight of material for an unending and continuous supply of material.

Other objects and advantages appear hereinafter in the following description and claims.

The accompanying drawings show for the purpose of exemplification without limiting the invention or claims thereto, certain practical embodiments illustrating the principles of this invention wherein:

FIG. 6 is a diagrammatic curve showing the operation of the weighing conveyor and the feeder conveyor with respect to each other to illustrate a timing cycle.

FIG. 7 is a graph illustrating the maximum theoretical wave forms that are characteristic of the circuit of FIG. 5.

FIG. 8 is a graph illustrating the theoretical wave forms of one-half the intensity of that shown in FIG. 3.

Figure 1:
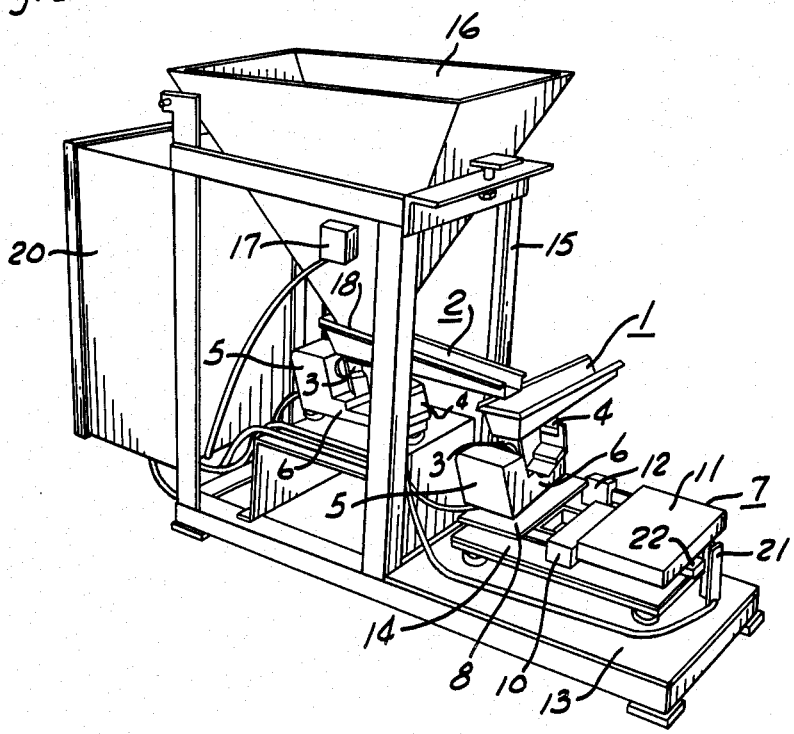
FIG. 1 is a perspective view of the gravimetric two feeder system comprising this invention.

Referring to FIG. 1, the gravimetric two-feeder system shown provides a gravimetric discharge conveyor 1 and an intermittently operating feeding conveyor 2 to supply material to the continuously operating discharge conveyor 1. The gravimetric discharge conveyor 1 continuously operates and is provided with a feeder trough supported by the cantilever springs 3 and 4 and actuated by the motor 5. The springs and the motor are mounted on the base 6 which in turn is supported on the weighing device or scale 7 wherein a platform 8 is supported from the pivot 10 and preloaded by the weights 11 and the poise 12.

The weighing device 7 is mounted on the common base 13 that supports the feeder conveyor 2, that is substantially the same as the conveyor 1, and is likewise provided with a trough supported by the cantilever springs 3 and 4 and actuated by the motor 5 supported from the base 6. The base 6 and feeder 2 are directly carried by the common base 13, and through the platform 14, placing the position of conveyor 1 so that it is positioned under the conveyor 2 mounted on a high box so that the feeding end of its trough will discharge in the back of the trough of the conveyor 1.

A frame 15 mounted on the base 13 supports the supply hopper 16 that may be provided with a hopper vibrator 17 which is electromagnetically operated to vibrate the walls of the hopper to insure movement of the material through the discharge throat 18 of the hopper 16. The control box 20 is also secured to the frame 15 for enclosing the structure which operates both of these feeders.

As shown at 21 in FIG. 1, the weighing device will actuate one or more switches, some of which are normally open and will be closed when a predetermined weight is received in the continuously operating discharge conveyor 1 and another contact which would be normally closed until a predetermined weight of the material is supplied to the continuously operating discharge conveyor 1. These two contacts are illustrated in the circuit control diagram that requires their use.

The continuously operating discharge conveyor or scale will also carry a permanent magnet 22 or an armature of magnetic properties, either of which when passed by a coil that may or may not have current flowing therethrough will affect the control of the current flowing therethrough and thus function as a magnetic pickup which is generally indicated with the switches at 21 and which is described in one of the control circuits comprising this invention.

The control box 20 also contains a timer and switches and other apparatus that are required in the control circuits. Timers of different types may be employed and such timers may be provided with normally closed as well as normally open contacts, which of course function at pre-set times, each of which is independently determined and some of which may be selected so as to be cooperative with each other, that is, in some instances a normally open contact and a normally closed contact may function at the same time or at different times, depending upon the use of the timer in the control circuit.

Figure 2:
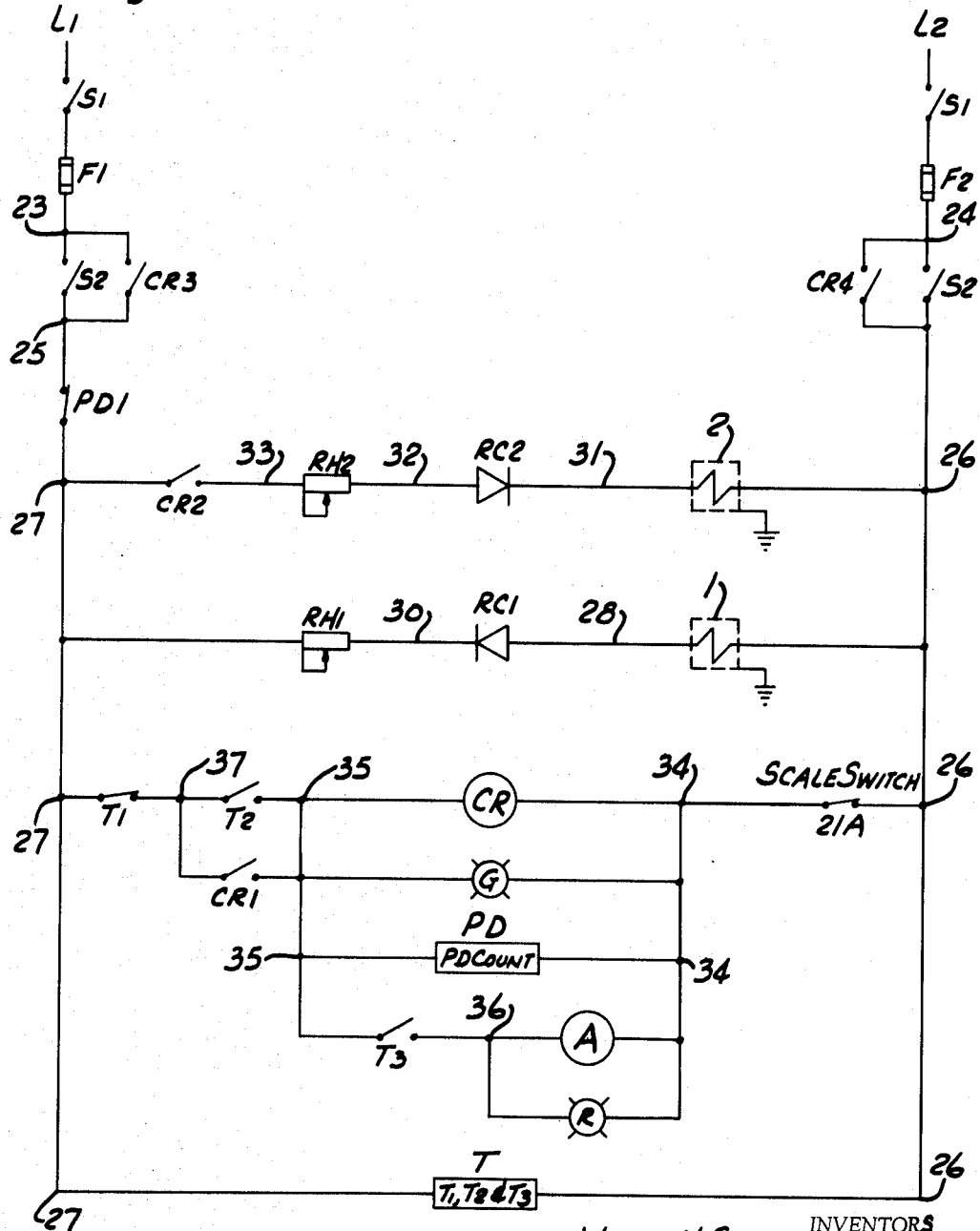
FIG. 2 is a simplified diagrammatic circuit for operating the gravimetric two feeder system.

Referring to the control circuit of FIG. 2, which is in effect the simplest of the control circuits and which is diagrammatically shown in FIG. 2, an alternating current is supplied to the circuit by lines indicated as L1 and L2, each of which may be controlled by a hand switch such as indicated at S1, the knife blades of which would be normally connected together, making it a single switch. Line L1 is connected to the switch S1, the other end of which is connected directly to the fuse F1 and thence to the line 23, which in turn is connected to the single throw switch knife blade of the double pole single throw knife blade switch S2 and to one side of the normally open contact CR3 of the CR relay. The opposite side of this switch S2 and the CR3 contact is connected by the line 25 to the normally closed back contact PD1 which is the back contact of the counter that registers the number of times the electrical supply circuit is opened. The other side of the counter contact PD1 is connected to line 27.

The line L2 is connected through the other blade of the switch S1 and the fuse F2 to the line 24 and thence the second blade of the switch S2 and CR4 contact, the opposite ends of both of which are connected to the line 26. Thus the lines 26 and 27 feed the several circuits including the timer T which is connected directly thereacross.

The continuously operating weigh conveyor 1 has one side of its operating coil connected to line 26 and the opposite side to line 28, to the power rectifier RC1, line 30, and rheostat RH1 connected in the manner of a potentiometer, the other side of which is connected to line 27. Thus the weigh feeder 1 is energized when the lines 26 and 27 are energized and is in parallel with the timer T. The charging feeder 2 has one of its operating coils connected through line 26 and the other side connected through line 31 to the rectifier RC2, the other side of which is connected by line 32 to the potentiometer type rheostat RH2, the other end of which is connected to line 33 that connects one side of the CR2 contact of the CR relay, a normally open contact, the other side of which is connected directly to line 27. Thus the series circuit for energizing the charge relay is controlled by the closing of the normally open CR2 relay and the feed rate of the charging feeder 2 is controlled by the rheostat RH2, and the rectifier RC2 supplies the operating coil of the charging feeder 2 with a half wave pulsating current. The rectifiers RC1 and RC2 are preferably silicon diodes and are connected so that they will employ the opposite half of the alternating current cycle delivered between the lines 26 and 27.

The control circuit shows line 26 connected through the normally closed scale contact switch 21a to line 34, one side of which is connected to one side of the operating coil of the CR relay, and to one side of the green light G, and to one side of the counter PD, and also to one side of the alarm A, and one side of the red light R.

The opposite side of the CR relay operating coil is connected to the line 35 which is also connected to the opposite side of the green light G and the opposite side of the counter PD, and to one side of the normally open timer contact T3, the opposite side of which is connected by the line 36, which is also connected to the other side of the alarm A and the other side of the red light R. Thus when the normally open timer switch T3 is closed the alarm sounds and the red light lights when potential is supplied to the line 35. This potential may be supplied by the closing of the normally open contact T2 of the timer T, which circuit is closed through the line 37 to the line 26 by the normally closed timer contact T1. When the timer T2 contact closes the CR relay becomes energized and its normally open CR1 contact then closes in parallel with the contact T2 and functions as a stick or holding circuit for the operating coil of the CR relay, which circuit can be opened only by the opening of the normally closed scale contact 21A or by the normally closed timer contact T1. Thus the single CR relay has its normally open contact CR2 controlling the operating of the charging feeder 2, which supplies the material to the weigh feeder 1, and this CR relay is interrupted by the opening of the normally closed scale switch 21A which occurs when the material on the constantly operating discharge conveyor 1 mounted on the weigh scale reaches a predetermined weight, causing the scale to balance and thus open contact 21A. Immediately upon de-energization of the CR relay the CR2 contact stops the charging feeder. However, the weigh feeder 1 continues to discharge the batch that has been weighed out on this conveyor. The timer contact T2 is then set and again closes to feed material from the charging feeder conveyor to the weigh feeder and this will occur leaving a short gap between the flow of the previously weighed batch and the batch being weighed, which gap is readily seen on the conveyor itself. Thus the timer contact T2 may be adjusted to open and close at a specific period, which has nothing to do with the physical operation of either the weigh feeder 1 or the charge feeder 2 but is set so that there is a slight gap between the batches and will maintain its contact for a sufficient length of time for the CR relay to pick up its stick contact CR1. Shortly after the end of the previously weighed batch discharges from the end of the continuously operating weigh feeder 1 and before the beginning of the next consecutive batch reaches its discharge point of the feeder 1 the charging feeder will have loaded the discharging feeder to the full weight of the adjusted batch of material, causing the scale to swing and again open the normally closed scale switch 21A, and in this manner the cycle of weighing consecutive batches is repeated and the material is supplied in a substantially constant feed with the exception of the small gap between the flow of consecutive batches determined by the setting of the operation of the timer contact T2.

The timer T operates continuously and produces timing cycles. The starting timer contact such as T2 in FIG. 2 is an impulse contact closed only for a sufficient length of time to insure the pickup or energization of the control relay CR and thereafter drops out. The timer contact T1 is set to open in a period of time that the feeder structure would have more than enough time to supply the batch to the weigh feeder. Thus T1 will open because the time period of proper cycle is obviously wrong. However T1 is measured from each recycling period.

If the timer contact T3 is closed within a predetermined length of time it will ring an alarm and light a red light to show that the CR relay was not cut out by the scale switch and that the time period is greater than that required to measure the batch. Ordinarily the timer contact T3 will function before the timer contact T1.

The predetermined counter PD is employed to provide an automatic cutoff of the entire control system when a desired quantity of material has been discharged. By adjusting its control dial when the number of batches for which it is set has been discharged, it automatically opens contact PD1, thus terminating operation of all circuit components including conveyors 1 and 2.

The switch S2 as previously mentioned is connected in parallel with the normally open set of contacts CR3 and CR4 operated by the control relay CR. The function of the switch S2 is to enable check weighing of any selected batch on the weigh feeder 2. This function is accomplished by opening switch S2 during the charging cycle when the relay CR is energized and the weigh feeder 2 is operating. When the scale has come into balance, scale switch 21A opens de-energizing control relay CR which opens contacts CR3 and CR4. Thus the entire system is de-energized enabling accurate weighing of the batch on the weigh feeder 2. The system is restored to automatic operation by closing switch S2.

Thus this simple circuit as illustrated in FIG. 2 relies solely upon the function of the timer and the CR control relay.

The operator having determined the frequency of the weight of batches to be discharged and having adjusted the scale to balance at a specific desired batch weight, then the cycle timer is adjusted to provide an electric signal at the desired time intervals for closing the control relay circuit CR, thereby weighing a predetermined batch on the continuously discharging weigh conveyor 1 within the cycle of time available or permissible. The batches are spaced sufficiently to assure that only one batch is weighed at any one time at the instant the charging feeder is cut off. This requires that the previous batch leave the weigh feeder 1 prior to the time the next succeeding batch reaches its proper weight. When the machine is properly adjusted it will continue to weigh consecutive batches and these will be of uniform weight at uniform spaced intervals without further attention and providing a very accurate total weight over a period of time.

Very low weigh-feeding rates are obtainable and accuracy enhanced by employing uniformly low weighing feeder charging speeds so that batch weight is approached slowly. The weighing feeder must also convey the batch until it reaches full weight, but must discharge quickly to enable full and accurate weighing of the succeeding batch. This circuit is illustrated at FIG. 3.

In this circuit the weigh feeder 1 which is connected in series with the silicon rectifier RC1 has the potentiometer rheostat RH1 connected in series with the CR5 contact which is normally closed and this series contact is connected in parallel with the potentiometer RH3 rheostat. When the back contact CR5 is closed the continuously discharging weigh feeder 1 will operate with the resistance RH1 and RH3 in parallel with each other, which will provide a high speed feeder operation. When the CR relay de-energizes the weigh feeder 1 will operate at a high speed but when the CR relay is energized to open CR5 the only resistance in the weigh feeder circuit is that of RH3 which reduces the speed of the weigh feeder during the time that it is being charged with a batch of material. This circuit also provides a time relay TD which has a normally closed back contact TD1 in series with the CR relay. This time delay relay is in parallel with the operating coil of the CR relay and it has a normally open front contact TD2 which is connected in series with the alarm A. Thus the time delay relay TD functions in place of the contact T3 of the timer T as described in conjunction with FIG. 2. Otherwise the circuit is substantially the same.

Figure 3:
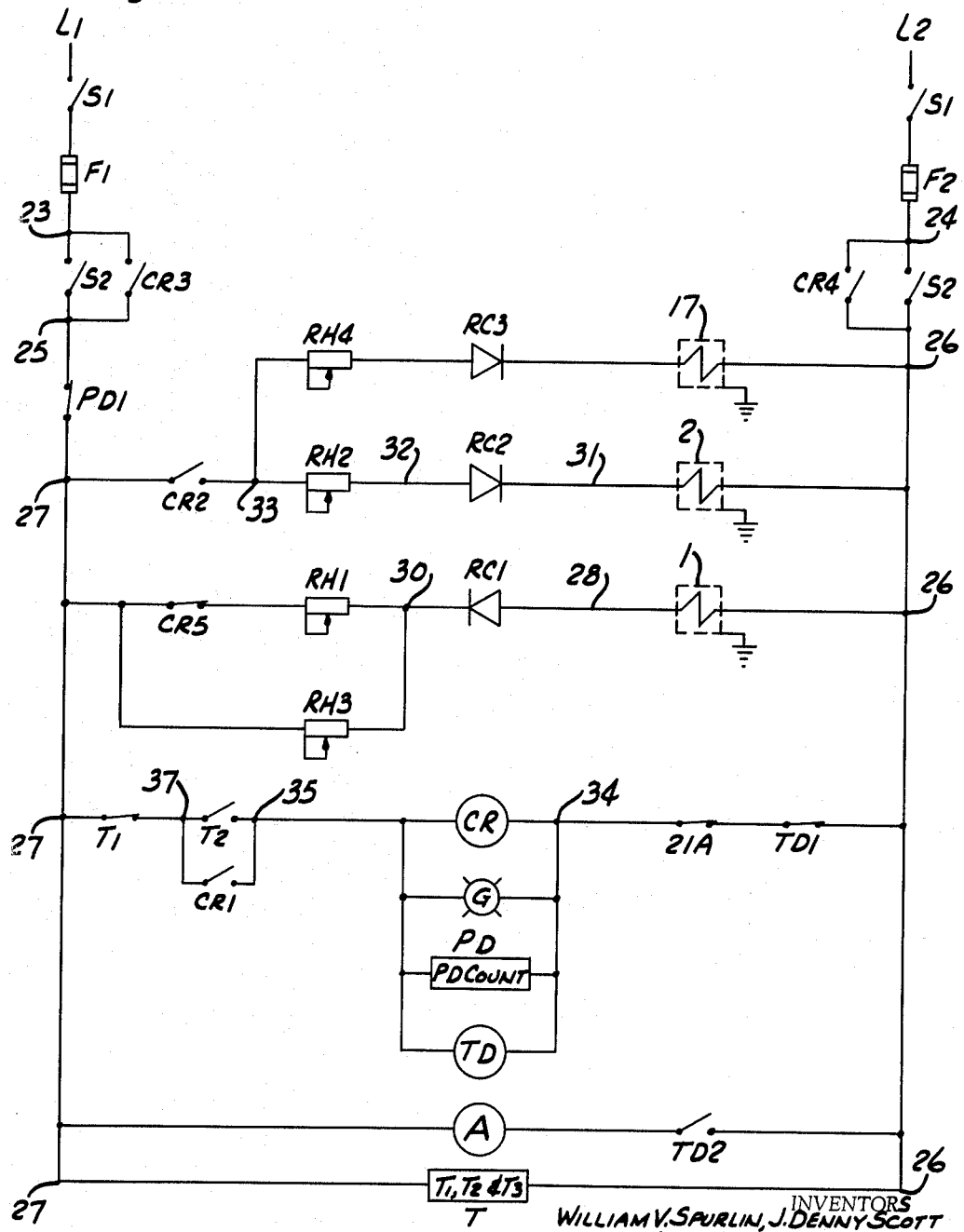
FIG. 3 is a diagrammatic circuit for operating the gravimetric two feeder system with fast and slow control of the continuously operating discharge weigh feeder conveyor.

The vibrator 17 may be supplied in the manner shown in FIG. 3 connecting the one side of its operating coil to line 26 and the other side to one side of the rectifier RC3 which is in turn connected to the control rheostat RH4, the other side of which is connected to line 33. This permits the vibrator 17 to function at the same time the feeder 2 is operated.

Figure 4:
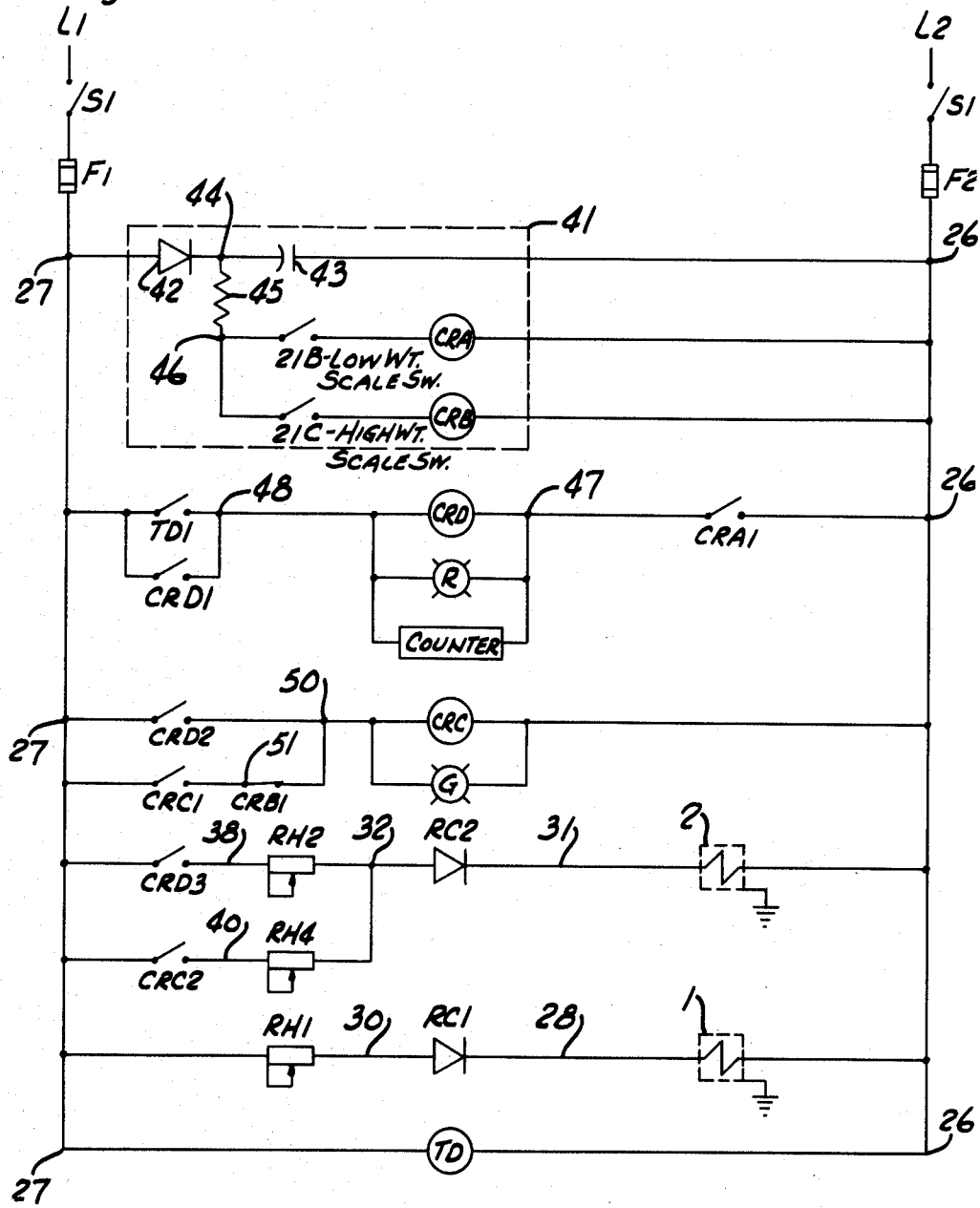
FIG. 4 is a diagrammatic circuit for operating the gravimetric two feeder system with fast and slow control of the supply feeder conveyor.

Batch weight accuracy may be enhanced by automatic deceleration of the batch charging weight to the weigh feeder as the batch on the weigh feeder approaches the scale setting. This type of control is shown in FIG. 4 wherein the weigh feeder 1 is directly across lines 27 and 26, as previously described in FIG. 2. The charge feeder is connected on one side to the line 26 and on its other side of the operating coil to line 31 which is connected to one side of the rectifier RC2, the other side of which is connected to line 32 that is in turn connected with rheostat RH2, the other side of which is connected to line 38 which in turn is connected to the normally open front contact CRD3, the other side of this contact being connected at 27. Line 32 is also connected to one side of the potentiometer resistance RH4, the other side of which is connected by line 40 to one end of the normally open front contact CRC2, the other end of which is connected to line 27. If CRC2 is closed and CRD3 is closed, the potentiometer resistance control RH2 will be in parallel with RH4 to allow the charge feeder 2 to operate at a fast rate of speed, whereas if the CRC2 contact alone is closed this potentiometer resistance control RH4 will permit the feeder 2 to operate at a slow or dribble feed.

In order to operate this circuit it is necessary to have a plurality of control relays. Two of these relays are shown in the enclosure indicated at 41 which includes the rectifier 42 connected to line 27 in series with the condenser 43, the other end of which is connected to line 26. Intermediate the rectifier and the condenser, line 44 is connected to resistance 45 which is connected by line 46 to one side of two contacts known as scale or weighing device contacts, one being the low weight contact 21B and the other being the high weight contact 21C. The low weight contact 21B being closed at the beginning of the charging cycle energizes the CRA relay through lines 46 to 26. The CRA contact in turn closes the normally open front contact CRA1 which enables the timer TD to energize the CRD relay through lines 47 and 48. TD1 is a front contact of the timer TD and is closed upon predetermined setting and connects the CRD relay circuit to line 27, thereby completing the circuit not only to the CRD relay but to the red light R and the counter which are connected in multiple with the CRD relay. The CRD relay is provided with a stick or holding contact CRD1 which is connected in parallel with the TD1 contact and thus maintains the CRD relay closed after it is energized through the closing of the TD1 and CRA1 contacts. Since the CRD relay is energized it will in turn close the normally open front contact CRD2 to connect line 27 to line 50, which is connected to one side of the CRC relay, the other side of which is connected to line 26. Thus upon the energization of the CRD relay the CRC relay is energized and since the green light is in parallel with the CRC relay it also lights.

Upon the energization of the CRC relay the normally open stick contact CRC1 is closed, which contact is connected in series by the line 51 with the normally closed back contact CRB1, which contacts are connected in parallel with the contact CRD2. As long as the high switch 21C remains open and the back contact of CRB1 remains closed the CRC relay will be maintained energized through its own stick or holding contact CRC1.

With contact CRD3 closed the resistance RH2 is placed in the circuit of the charge feeder 2 and likewise since the CRC relay is energized its contact CRC2 is likewise closed, placing the resistance RH4 in the circuit of the charge feeder. With both of the resistances in multiple in this charge feeder 2 it will be caused to operate at a higher voltage and thus increase the feed until the low switch 21B on the scale opens. When this happens the CRA relay is de-energized, thereby de-energizing the CRD relay, and this will then open the CRD3 contact, thus eliminating the resistance RH2 from the circuit, and the charge feeder 2 will then be supplied only through CRC2 contact and the resistance RH4 providing a slow feed of the charger until either the low or the high switch 21B or 21C in the scale is actuated. When the high switch 21C is closed then relay CRB is energized, which opens the contact CRB1 in the stick circuit of the CRC relay, which in turn opens CRC2 contact and thus de-energizes or stops the charge feeder. In this manner the material in the batch fed to the constantly discharging weigh feeder 1 approaches the total batch weight only if a slow feed is provided, and when the batch is up to weight the scale contact 21C opens and thus de-energizes the CRB relay, which as previously stated stops the charge feeder 2. Thus the charge feeder has an opportunity to reduce its flow just before it is interrupted, which provides a more accurate weight of each batch that the discharge feeder delivers to the continuously operating discharge feeder 1.

Figure 5:
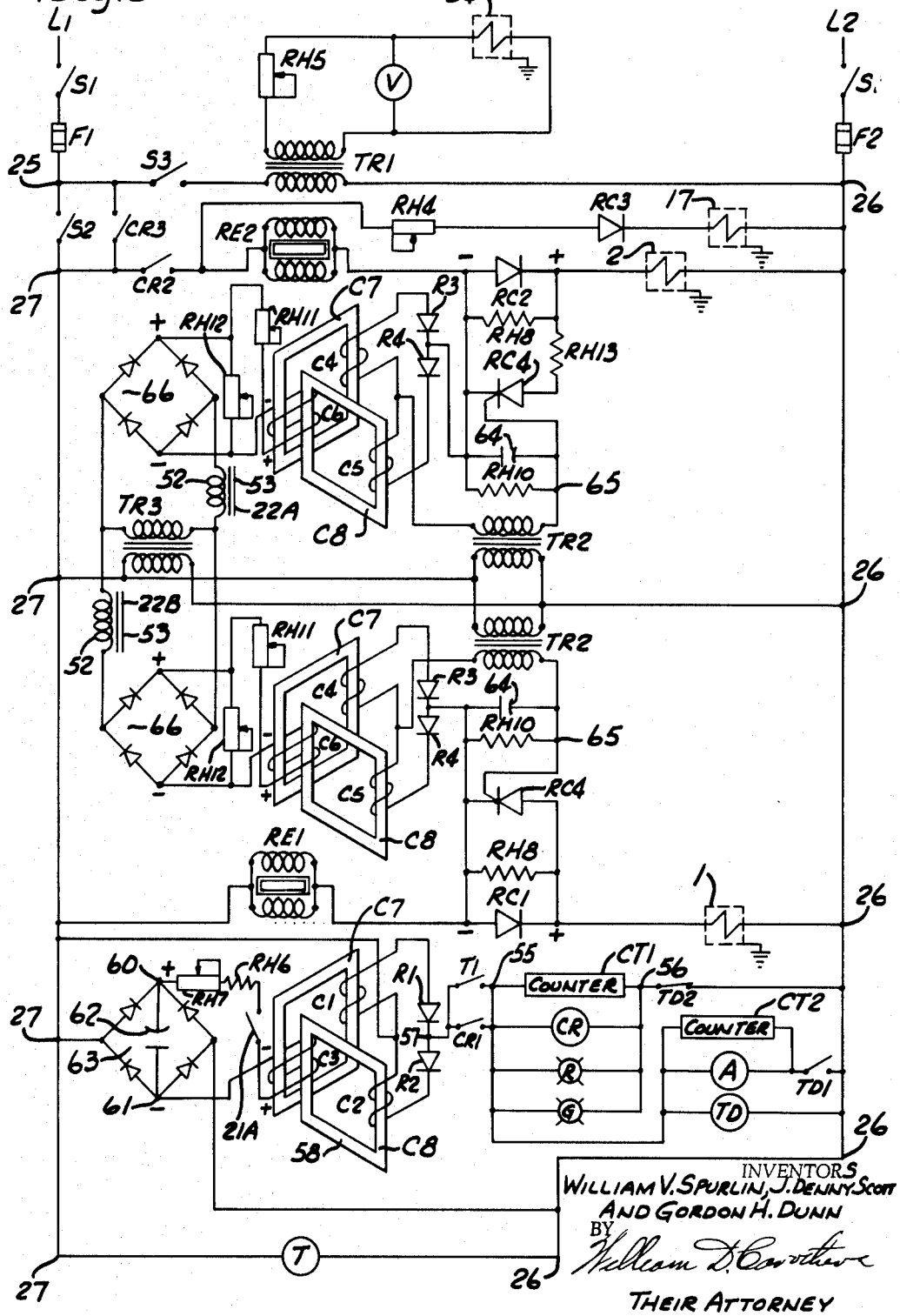
FIG. 5 is a diagrammatic circuit for operating the gravimetric two feeder system with a magnetic pickup controlling a magnetic amplifier to operate a silicon controlled rectifier in parallel with a power semiconductor rectifier in the series circuit of the feeder conveyor and its saturable reactor.

FIG. 5 shows a more complicated circuit which is arranged to control the operation of the continuously operating weigh feeder 1 and the charge feeder 2 in a manner similar to that disclosed in FIG. 4.

In this circuit the magnetic pickup is indicated at 22A and it includes an operating coil 52 and armature 53, both of which are mounted in operating position. A similar magnetic pickup indicated at 22B in FIG. 5 is also provided with a coil 52 and an armature 53. The armature 53 of these magnetic pickups are fixed to the weighing device so that they may move past or in their respective coils 52 and thus change the reluctance of the circuit. The magnetic pickup 22A is connected in the operating circuit for the charge feeder 2, whereas the magnetic pickup 22B is positioned in the operating circuit for the continuously operating discharge conveyor 1.

In the circuit shown in FIG. 5 the switch S3 is connected at one side to the line 25 and at its other side to the primary of the transformer TR1 and the other side of which is connected to line 26. The secondary of the transformer TR1 is connected to a magnetic counterpoise 54 in series with the potentiometer resistance RH5.

In this circuit the control CR is placed in parallel with the counter CT1 and is connected to the line 26 through the normally closed contact TD2. The front contact TD1, which is the normally open contact, is connected to line 26 to an error counter CT2 that is in parallel with the alarm A, which circuit is connected in parallel with the operating coil of the time delay relay, one side of which is connected to the line 26 and the other side of which is connected to the line 55. The line 55 is connected to one side of the counters CT1 and CT2 and one side of the operating coil of the relay CR and is also connected to one side of the normally open stick contact CR1 and one side of the normally open T1 contact of the timer T. The other side of the stick or holding contact CR1 and the T1 contact is connected by the line 57 to the loop circuit in the switching reactor 58 between the rectifiers R1 and R2 connected in series with the switching reactor coils C1 and C2, the line 57 being connected to the rectifiers R1 and R2 and the other end of the circuit being connected to line 27 from between the coils C1 and C2.

Thus the circuit of the error counter CT2 and the CR relay and the counter CT1 are controlled by the normally open contact T1 of the timer T, which circuit in maintained by the CR1 contact of the relay CR. If the time delay period of the TD1 contact is reached this contact will close and sound the alarm and the counter CT2 will indicate the number of times that the alarm has been sounded. Further delay in time will open the contact TD2 and thus open the CR relay circuit. This is the protective part of the control mechanism which is not only based upon time from the timer T but is also based upon time by reason of the time delay relay which has two independently adjustable contacts, one normally open TD1 and the other normally closed TD2. These contacts may be adjusted to operate independently or simultaneously.

The control winding C3 of the switching reactor 58 is connected in series with a scale balance switch 21A and the resistances RM6 and RM7 are connected in series with the scale switch 21A and to the positive terminal at 60 of the bridge rectifier, the negative terminal 61 of which is connected directly to the other end of the control winding C3. A condenser 62 is connected across the positive and negative terminals of the bridge rectifier 63. The AC terminals of the bridge rectifier 63 are connected directly to the lines 26 and 27 as shown.

The weight feeder 1 is supplied by power from the power rectifier RC1 and the charge feeder conveyor 2 is connected in series with the power rectifier RC2. Both of these power rectifiers have a resistance RH8 connected in parallel therewith as well as the silicon control rectifier RC4. The anodes of the RC4 rectifiers are connected to the respective cathode of the RC1 and RC2 power rectifiers and the cathode of the RC4 silicon control rectifiers are connected to their respective anodes of the RC1 and RC2 rectifiers as shown in FIG. 5. The cathode of each of the control rectifiers RC4 is also connected to a point between the loop rectifiers R3 and R4 and also to one side of a condenser 64 and a resistance RH10 in parallel with each other and which are connected to the respective gates 65 of the control rectifiers RC4. These gates are also connected to one side of the isolating transformer secondaries TR2, the primaries of which are connected directly to the lines 26 and 27. The other side of the secondaries of the transformer TR2 is connected to the adjacent ends of the operating coils C4 and C5 of their respective magnetic amplifiers having the control winding C6. As indicated on the drawings, each magnetic amplifier as well as the switching reactor has its control winding C3 and C6 wound around both cores C7 and C8, whereas the windings C1 and C4 are wound only around the core C7 and the coils C2 and C5 are wound around the other circular core C8.

The control windings C6 are connected in series with a variable resistance RH11 and across their respective bridge supply rectifiers 66 at the positive and negative positions. The variable resistance RH12 is connected across the control winding C6. The alternating current points of these rectifiers are connected to the secondary of an isolating transformer to their respective magnetic pickup coils 22A and 22B. The primary of this isolating transformer TR3 is connected across the lines 26 and 27. This completes the control of each of the power rectifiers that supply current to the weigh feeders 1 and 2 in series with their reactors RE1 and RE2. The reactor RE1 is connected to the line 27, thus completing the circuit for the continuously operating weight feeder 1. However, the reactor RE2 does not complete the circuit for the charge feeder 2 as this circuit is completed through the normally open CR2 contact in the line 27. Thus when the CR relay is energized its normally open front contact CR2 will complete the circuit to energize the charging feeder 2. It also supplies the current for the vibrator 17 through the rectifier RC3 as shown. This later circuit is, of course, not amenable to the control of the reactance RE2 or the silicon control rectifier RC4.

The foregoing magnetic pickup 22A and 22B circuits actuated with their respective magnetic amplifiers and controlled through magnetic switching reactor 58 operates to function in the same manner as the structure as illustrated in FIG. 4. However, a variable control is provided for each of the weigh feeder 1 and the charge feeder 2 by the control rectifier RC4. The reactors RE1 and RE2 are toroidal. These saturable reactors RE1 and RE2 have a toroidal core that is endless and is provided with an endless winding that extends continuously therearound with circuit connections made at diametrically opposite positions, thereby forming two independent windings connected in parallel but effective in opposite directions. Each power semiconductor rectifier RC1 and RC2 is preferably a power silicon diode with an anode and a cathode which is connected inversely with respect to the silicon control rectifier RC4. Thus the anode and the cathode of the power semiconductors RC1 and RC2 are connected respectively and directly to the cathode and anode of its respective silicon control rectifiers RC4. This provides a mutual protection between one semiconductor and the other and from a peak inverse voltage. Thus one semiconductor shunts the high inverse voltage for the other. Thus each semiconductor saves the other semiconductor and is connected in parallel therewith.

The silicon control rectifiers RC4 are preferably of the PNPN type semiconductors because of their ease to trigger into operation due to effective use of junction area for current conduction and, therefore, they make a higher voltage device than most silicon semiconductors. A limiting current resistance RH13 is connected between the cathode of the power semiconductor and the anode of the silicon control rectifier RC4. The resistances RH8 which are connected in parallel with the power semiconductors RC1 and RC2 suppress any unwanted oscillation and the isolating transformers TR2 provide a constant voltage for these magnetic amplifiers.

Each load operating circuit is provided with magnetic amplifiers having their power windings C4 and C5 wound around separate and independent cores C7 and C8. However, their saturable control winding C6 is wound around both of the continuous annular or ring type cores C7 and C8 and as previously stated one end of each of the power windings C4 and C5 is connected together and to the secondary of the isolating transformer TR2. The other ends of the power windings C4 and C5 are connected to the opposite ends of the pair of diodes R3 and R4 for each load operating circuit. The mid point between the diodes R3 and R4 is connected directly to the end of each power rectifier RC1 and RC2 as shown. The control saturable windings C6 of the magnetic amplifiers vary the amount of direct current to both of the ring type cores C7 and C8 of their respective magnetic amplifiers, which transform the direct current supply from the bridge rectifiers 66 into a suitable wave shape, which wave shape is impressed on the gate connecttion of the silicon control rectifier RC4. The resultant effect of the gate control rectifiers acts like a variable resistance through a rheostat control when connected across the silicon power rectifiers RC1 and RC2 respectively.

The magnetic amplifiers supplying the gate control circuits impress the desirable step wave front of gate current with a convenient low level direct current control.

The diodes R3 and R4 of each load operating circuit prevent any reverse current through the power windings C4 and C5 of the magnetic amplifier.

The secondary windings of the isolating transformers TR3 supply a full wave rectifier bridge 66 which in turn supplies a full rectifier wave to the control windings C6 of the magnetic amplifier through saturable control resistances and through the magnetic pickup windings 52 of the magnetic pickups 22A and 22B respectively. Thus the magnetic pickups control the magnetic amplifiers of each respective load operating circuit.

The gates of each of the respective silicon control rectifiers RC4 which are connected to the secondary of the respective isolating transformers TR2 change the wave form through the gate control rectifiers and the power rectifier, thus affecting the wave form passing through the saturable reactors RE1 and RE2 respectively. This wave form thus affects the extent of energy valved through the series operating circuit of the weigh feeder 1 and the charge feeder 2 respectively and by means of the magnetic amplifier one may provide a very accurate control through the saturable reactors that are connected in series with the power rectifiers RC1 and RC2 respectively.

As shown in the graph of FIG. 7, the maximum theoretical wave forms of the circuit are shown at ABCDE, which represent a complete cycle of line voltage, whereas the load or feeder coil voltage when set to operate at a maximum amplitude of the conveyor would be designated by the current curve AFG, whereas the feeder voltage curve would be AFCDG. The current AFG in the feeder coil represents a feeder coil impulse. Under this condition proper inverse current to the reactor RE1 and 2 respectively is maintained. It should be noted that this inverse current is zero at high operating voltage. There is no leakage current effective when the maximum saturation point is obtained in the saturable reactor RE1 and RE2 respectively.

FIG. 8 represents the same theoretical curves as shown in FIG. 7 except that in FIG. 8 the voltage on the feeder coil is reduced to one-half of that shown in FIG. 7 by increasing the gate voltage of the silicon controlled rectifier RC4. It is evident from this figure that there will be a reduction in the vibratory amplitude of the feeder due to not only smaller wave forms AB′CDE but also due to a sooner cutoff point G in FIG. 8 as compared to the same relative point in FIG. 7. Also there is a slight inverse current flow GE through the silicon controlled rectifier RC4 of the respective circuits at this lower operating voltage.

As the control rheostat RH12 is varied the phase angle of the corresponding controlled rectifier RC4 is varied and thus the conduction cycle (the positive half cycle) is advanced or retarded, thereby shunting more or less current across the corresponding power semiconductor RC1 or RC2 respectively. This curent controlled by the rheostat RH12 or the respective magnetic pickup, as the case may be, in turn controls the amount of reset control resaturation on the corresponding saturable reactors RE1 and RE2 respectively, which results in a controlled amount of impedance in series with the feeder or load. Thus by controlling the series impedance of the saturable reactors RE1 and RE2, the voltage to the feeder magnetic coils 1 and 2 may be regulated. This is due to only the breakdown characteristics of the silicon control rectifier RC4 and the small resistance characteristics in the circuit. This current may increase as the feeder amplitude decreases but the actual operation of the feeder coil is controlled and still remains primarily lineal. At very low feeder amplitude correction of lineal operation can be made in the adjustable band area. Thus with lineal control one may calibrate the same to provide an accurate batch weight in the charge feeder tube in supplying the batch weights of material to the weigh feeder 1.

Control of the batches in this manner gives the operator an opportunity to accurately control the free supply of material over a specific period of time. This is made possible due to the lineal operation brought about by the magnetic amplifier operating through a silicon controlled rectifier on the saturable reactors.

Although the magnetic amplifier is shown to supply the control of the weigh feeder 1, this weigh feeder in FIG. 5 could be constantly operated as illustrated in FIG. 2 and a control with a magnetic pickup provided only for the charge conveyor 2. A very good control is provided in the surface controlling only the charging conveyor 2 rather than both conveyors or rather than only the weigh conveyor 1 as illustrated in FIG. 3.

FIG. 6 is a diagrammatic view showing the feeder operation as controlled by the circuit shown in FIG. 4. Such diagrammatic view can be shown for the other circuits comprising this invention. However it is sufficient for the purpose of showing the cycling of the two feeders while operating by demonstrating such operation through only one of the circuits as shown in any of the figures from 2 to 5.

In FIG. 6 there is a time cycle upon which three different operations are illustrated. These operations are the charge feeder, the weigh feeder and the time signal and the energizing and de-energizing of the relays CRC and CRD. At the first vertical line the charging feeder 2 begins to discharge to the weigh feeder 1 because at this time, as shown in FIG. 4 the low scale switch is closed, energizing the relay CRA. Since the stick contact CRA1 closes enabling the timer TD to close its contact TD1, the relay CRD energizes its contact CRD2 and CRD3 initiating the charging cycle.

Upon closing of the contact CRD2 the relay CRC is energized and closes its contact CRC1 and CRC2. With the contacts CRD3 and CRD2 closed the charge feeder commences to operate as indicated at the first vertical line in FIG. 6 at a high speed. In the meantime the weigh feeder 1 which continually operates is discharging the previous batch from its trough.

The second vertical line in FIG. 6 indicates the end of the high speed operation of the charge feeder 2 wherein the low weigh scale switch has opened and de-energized the relay CRA which in turn de-energizes the relay CRD. However, the relay CRC remains energized through the relay contacts CRC1 and CRB1. Therefore, the contact CRC2 of the relay CRC remains closed while the contact CRD3 opens. The charge feeder 2 then operates at a much slower speed since the resistance RH2 is not in multiple with the resistance RH4. As indicated in FIG. 6, between the second vertical line and the third vertical line the charge feeder 2 operates at a slower speed or at a dribble. This action and type of control brings about more accurate weighing by the charge feeder when discharging to the weigh feeder.

The third vertical line indicates the time when the high weigh scale switch 21C is caused to be closed, which indicates that the weight of the batch to be discharged has been reached. Upon closing of the switch 21C the relay CRC is energized. Therefore the normally closed contact CRB1 is opened, thereby de-energizing the relay CRC which in turn opens its contact CRC2. The charge feeder 2 then stops its operation. A short time later the first part of this current batch begins to discharge from the end of the weigh feeder 1. When this current batch is practically all discharged the cycle repeats itself wherein the timer as well as the low weigh scale switch commences to operate causing the relay CRD and CRC to energize and the charge feeder 2 commences to discharge a new batch at high speed. The dotted line between the discharged previous batch and discharged current batch indicates the time spacing interval between the previous batch and the current batch. The slanted dotted line between the end of the dribble operation of the charge feeder 2 and the commencing of the discharge of the current batch merely represents the connection between the charge feeder 2 and the weigh feeder 1 with respect to measuring, weighing and discharging of one particular batch.

The counterpoise 54 which is shown at the top of FIG. 5 and which is supplied through the secondary of the transformer TR1 and connected in series with the variable resistance RH5 has a volt meter shown connected across the same. This magnetic counterpoise is in the form of a coil which is mounted adjacent the beam of the weighing scale which beam has a magnetic core attached thereto and extending into the coil 54 of the magnetic counterpoise. In its normal position of rest the core of magnetic material is centered within the coil 54 and the alternating current flows provided by the transformer secondary is varied by the amount of voltage controlled by the resistor RH5 across this coil 54. The volt meter shown may be calibrated in terms of pounds-counterpoise. Since the weight of a batch of the material supplied by this gravimetric two feeder system may be within a range of hundred pounds it is, of course, desirable that the beam of the weighing device does not move until the weight of the batch approximates ten or so pounds of the weight of the batch. For this reason the resistance RH5 is adjusted to supply an alternating current voltage across the magnetic counterpoise coil 54 equivalent to produce a counterpoise force of ten pounds which will, of course, not be effective until the beam starts to move as when the batch being weighed by the device is within ten pounds of the desired amount. When this occurs, the beam starts to move and the magnetic pull on the centered core becomes greater as the beam attempts to pull the same out of the energized coil 54. In this manner the magnetic device 54 actually becomes a counterpoise in that it adds weight as a counterpoise to the weighing device.

As the beam of the weighing device continues to move the magnetic pickup 53 is effective on the coil 52 through the magnetic amplifier to reduce the electrical energy fed to the charging feeder 2.

When the exact weight of the batch on the weighing device has reached the ultimate amount, then the scale switch 21A closes the circuit through the coil C3 and the switching reactor 58 to thereby stop the feeder conveyor by de-energizing the CR relay and opening the contact CR2.

It is seen from the foregoing that the magnetic counterpoise has the effect of making the weighing device insensitive to within a few pounds of the batch being weighed until the batch approximates within a low percentage of the weight of the batch by the setting of the resistance RH5 for conntrolling the voltage across the magnetic counterpoise 54 and thus its effective counterpoise weight on the beam of the weighing device.

We claim:

1. In a conveying system the method of closely controlling the mean feed rate and the total amount discharged to obtain a predetermined total output of the feeding system which comprises the steps of continuously operating a gravimetric discharge conveyor, intermittently operating a feeding conveyor to supply material to the continuously operating gravimetric discharge conveyor, interrupting the operation of the feeding conveyor when a batch weight on the continuously operating gravimetric discharge conveyor reaches a predetermined amount, and continuing the interruption of the operation of the feeding conveyor for a predetermined period of time sufficient to space the weighed batch from the next succeeding batch on the continuously operating gravimetric discharge conveyor.

2. A controlled material feeding system consisting of a constantly operating discharge conveyor, a weighing device supporting said discharge conveyor and having a back contact opened by a batch of predetermined weight of material on said discharge conveyor, a feeding conveyor mounted to supply the material to form said batch of predetermined weight to said discharge conveyor and having an operating coil, a control circuit to operate said feeding conveyor and including a timer having a back contact connected in series with said operating coil and said back contact of said weighing device, and means in said timer to close said timer back contact after the passage of a time period sufficient to complete the discharge of said batch of predetermined weight from said discharge conveyor to permit no more than one batch on said discharge conveyor at one time.

3. In a conveying system cycling operation the method of closely controlling the mean feed rate and the total amount discharge to obtain a predetermined total output of the feeding system which comprises the steps of continuously operating a gravimetric discharge conveyor, intermittently operating a feeding conveyor to supply material to the continuously operating gravimetric discharge conveyor, timing the energization operating time of the intermittently operating feeding conveyor, interrupting the operation of the intermittently operating feeding conveyor when the weight of the material on the discharge conveyor reaches a predetermined amount, timing the continuation of the operation of the intermittently operating feeding conveyor in a period of time that permits the continuously operating discharge conveyor to discharge the measured material thereon and re-cycling the operating time period and the interruption time period to effect a constant feed of the material.

4. A controlled material feeding structure consisting of a weighing device having a normally closed contact which will open when a predetermined weight of material is carried by the weighing device, a continuously operating conveyor on said weighing device to relieve and discharge material, a feeding conveyor mounted to supply material to said continuously operating discharge conveyor, a timer having normally open and normally closed contacts, a control relay having its operating coil connected in a circuit in series with said weighing device contact and a normally closed timer contact and a normally open timer contact, a holding front contact on said control relay connected in parallel with said normally open timer contact to maintain said control relay energized when said series circuit is completed by said normally open timer contact, said normally closed timer contact opening said control relay circuit after a predetermined time if not previously opened by said weighing device contact, and a normally open operating contact on said control relay to control the operation of said feeding conveyor.

5. A controlled material feeding structure consisting of a weighing device having two normally open contacts, one which will close when the weight of the material on the weighing device is low and the other when a predetermined weight of material is on the weighing device, a continuously operating conveyor mounted on said weighing device to receive and discharge material, the weight of which operates said contacts, a feeder conveyor mounted to supply material to said continuously operating discharge conveyor, a first relay energized by one of said contacts which closes when the material on said continuously discharging conveyor is low and is in need of a fast feeding operation, a second relay energized by the other of said contacts which closes when the weight of material on said weighing device is at a predetermined amount and interrrupts said feeder conveyor, a third relay having its operating coil connected in a circuit in series with a normally open contact on said first relay and a normally open timer contact, a holding front contact on said third relay connected in parallel with said normally open timer contact, and a timer having a contact to initiate the operation of said feeder conveyor to initiate the operation of said relays and automatically measure and deliver a series of batches of material.

6. A controlled material feeding structure consisting of a weighing device having a magnetic pickup and one normally open contact which closes when a predetermined weight of material is on said weighing device, a continuously operating conveyor mounted on said weighing device to receive and discharge material the weight of which operates said contact, a feeder conveyor mounted to supply material to said continuously operating discharge conveyor, a first timer having a normally open contact, a second timer having normally open and normally closed contacts, a control relay having two normally open contacts and its operating coil in series with said first timer normally open contact and in series with the normally closed contact of said second timer, one of said relay contacts connected in parallel to said normally open contacts of said first timer to function as a holding contact, a power semiconductor having an anode and cathode connected in series with said second normally open contact of said relay to supply operating energy to said feeder conveyor, a variable reactor connected in said series operating circuit, a silicon control rectifier having an anode and a cathode and a gate with its anode and cathode connected reversely with respect to said cathode and anode of said power semiconductor, a magnetic amplifier having its output connected to supply a control energy to the gate of said silicon control rectifier and its input connected in series with said magnetic pickup, and a switching reactor connected to supply said series circuit of said relay operating coil, said normally open weighing device contact connected to control the operation of said switching reactor which contact when closed closes the circuit to energize said relay and energize the operating circuit of said feeder conveyor which is interrupted by said magnetic pickup controlling said magnetic amplifier and said gate circuit.

7. The control circuit of claim 6 wherein said switching reactor has a tapped winding forming two coils connected in the loop of a bridge circuit with two semiconductors connected in series, one energy source line connected to said tapped winding between the two coils and the relay operating coil circuit connected between the semiconductors, and a control coil or switching reactor with said tapped winding and supplied with a direct current source connected in series with said normally open weighing device contact.

8. The control circuit of claim 6 wherein said second timer operating circuit is connected in multiple with the series connection of said control relay operating coil and its own normally closed back contact.

9. The method of claim 1 which also includes applying a counterpoise resistance to movement upon the gravimetric system of the discharge conveyor to delay the gravimetric movement of the feeder conveyor until the weight of the batch on the conveyor approaches the predetermined batch weight to within a few percent.

10. The method of claim 3 which also includes applying a counterpoise resistance to movement upon the gravimetric system of the discharge conveyor to delay the gravimetric movement of the feeder conveyor until the weight of the batch on the conveyor approaches the predetermined batch weight to within a few percent.

11. A controlled material feeding system including a base, a weighing device on said base having a normally open contact which is closed when a predetermined batch of material is received on the weighing device to balance the same, a continuously operating conveyor on said weighing device to receive and discharge the batch of material, a feeding conveyor mounted to supply material to said continuously operating conveyor, a magnetic counterpoise including a magnetic armature core on said weighing device and an energized coil on said base to receive said coil and having a variable voltage applied thereto to magnetically hold said core within said coil with a force equivalent to a counterpoise weight on said weighing device that is made variable by the variable voltage applied thereto, a control relay having normally open contact in the operating circuit of said feeding conveyor, and an operating circuit of said control relay being opened by the closing of said weigh device contact after the weight of the material threon has overcome the effective force of said counterpoise weight.

12. The controlled material feeding structure of claim 6 which also includes a magnetic counterpoise including a coil having a variable voltage supply, a core mounted to move with said weighing device into and out of said coil and which is magnetically held within the energized coil with a force equivalent to the counterpoised weight on said weighing device that is made variable by the variable voltage applied to the coil, the counterpoise force of said magnetic counterpoise retarding the movement of the weighing device as the predetermined weight of the batch thereon is approached and permitting the magnetic pickup to slow down the feeder conveyor and to open the feeder circuit when the predetermined weight is reached.

13. A controlled material feeding structure consisting of a weighing device having a magnetic pickup and one normally open contact which closes when a predetermined weight of material is on said weighing device, a continuously operating conveyor mounted on said weighing device to receive and discharge material the weight of which operates said contact, a feeder conveyor mounted to supply material to said continuously operating discharge conveyor, a timer having a normally open contact, a control relay having two normally open contacts and its operating coil in series with said timer normally open contact, one of said relay contacts connected in parallel to said normally open contacts of said timer to function as a holding contact, a power semiconductor having an anode and cathode connected in series with said second normally open contact of said relay to supply operating energy to said feeder conveyor, a variable reactor connected in said series operating circuit, a silicon control rectifier having an anode and a cathode and a gate with its anode and cathode connected reversely with respect to said cathode and anode of said power semiconductor, a magnetic amplifier having its output connected to supply a control energy to the gate of said silicon control rectifier and its input connected in series with said magnetic pickup, and a switching reactor connected to supply said series circuit of said relay operating coil, said normally open weighing device contact connected to control the operation of said switching reactor which contact when closed closes the circuit to energize said relay and energize the operating circuit of said feeder conveyor which is interrupted by said magnetic pickup controlling said magnetic amplifier and said gate circuit.

14. A controlled material feeding structure consisting of a weighing device having a magnetic pickup and one normally open contact which closes when a predetermined weight of material is on said weighing device, a continuously operating conveyor mounted on said weighing device to receive and discharge material the weight of which operates said contact, a feeder conveyor mounted to supply material to said continuously operating discharge conveyor, a timer having a normally open contact, a control relay having two normally open contacts and its operating coil in series with said timer normally open contact, one of said relay contacts connected in parallel to said normally open contacts of said timer to function as a holding contact, a power semiconductor having an anode and cathode connected in series with said second normally open contact of said relay to supply operating energy to said feeder conveyor, a variable reactor connected in said series operating circuit, a silicon control rectifier having an anode and a cathode and a gate with its anode and cathode connected reversely with respect to said cathode and anode of said power semiconductor, a magnetic amplifier having its output connected to supply a control energy to the gate of said silicon control rectifier and its input connected in series with said magnetic pickup, and a switching reactor connected to supply said series circuit of said relay operating coil, said normally open weighing device contact connected to control the operation of said switching reactor which contact when closed closes the circuit to energize said relay and energize the operating circuit of said feeder conveyor which is interrupted by said magnetic pickup controlling said magnetic amplifier and said gate circuit, a magnetic counterpoise including a coil having a variable voltage supply, a core mounted to move with said weighing device into and out of said coil and which is magnetically held within the energized coil with a force equivalent to a counterpoised weight on said weighing device that is made variable by the variable voltage applied to the coil, the counterpoise force of said magnetic counterpoise retarding the movement of the weighing device as the predetermined weight of the batch thereon is approached and permitting the magnetic pickup to slow down the feeder conveyor and to open the feeder circuit when the predetermined weight is reached.

15. A controlled material feeding structure consisting of a weighing device having a magnetic pickup which is engaged and which closes when a predetermined weight of material on said weighing device causes it to move toward balance, a continuously operating discharge conveyor mounted on said weighing device to receive and discharge material the weight of which operates said contact, a feeder conveyor mounted to supply material to said continuously operating discharge conveyor, a first timer having a normally open contact, a second timer having operating contacts on a normally closed contact, and a normally open TD1 contact, a control relay having two normally open contacts and having its operating coil connected in series with said normally open contact and in series with said normally closed contact, one of said control relay normally open contacts connected in parallel with said normally open contact of said first timer to function as a holding contact for said control relay, a power semi-conductor having an anode and cathode circuit connected in series with said second normally open contact of said control relay to supply operating energy to said feeder conveyor, a variable reactor connected in said series operating energy circuit of said feeder conveyor, a silicon control rectifier having an anode and a cathode and a gate with its anode and cathode connected reversely with respect to said cathode and anode of said power semiconductor, a magnetic amplifier having its output connected to supply a control energy to the gate of said silicon control rectifier and its input connected in series with said magnetic pickup, a switching reactor connected to supply said series circuit of said control relay operating coil, said normally open weighing device contact connected to control the operation of said switching reactor which contact when closed completes the circuit to energize said relay CR and energize the operating circuit of said feeder conveyor which feeder is slowed down by the operation of said magnetic pickup controlling said magnetic amplifier and said gate circuit and stopped by the opening of said normally open weighing device contact when the weight of material on said continuously operating conveyor has reached the predetermined amount.

References Cited by the Examiner

UNITED STATES PATENTS

| | | | |
|---|---|---|---|
| 2,081,367 | 5/1937 | Nicolson | 177—210 |
| 2,823,005 | 2/1958 | Lindars | 177—80 |
| 3,091,301 | 5/1963 | Stone | 177—1 |
| 3,094,182 | 6/1963 | Garnett et al. | 177—1 |

FOREIGN PATENTS 362,702   12/1931   Great Britain.

LEO SMILOW, *Primary Examiner.*